United States Patent
Schaefer

[11] 3,922,066
[45] *Nov. 25, 1975

[54] REFLECTIVE ROADWAY MARKER

[75] Inventor: Howard A. Schaefer, Lancaster, Ohio

[73] Assignee: Anchor Hocking Corporation, Lancaster, Ohio

[ * ] Notice: The portion of the term of this patent subsequent to Apr. 15, 1992, has been disclaimed.

[22] Filed: Aug. 1, 1974

[21] Appl. No.: 493,927

Related U.S. Application Data

[63] Continuation-in-part of Ser. No. 296,947, Oct. 12, 1972, Pat. No. 3,877,785.

[52] U.S. Cl. ............... 350/104; 404/12; 404/14
[51] Int. Cl.² ................................. G02B 5/126
[58] Field of Search ......... 404/12, 14; 350/104, 106

[56] References Cited
UNITED STATES PATENTS

| 3,693,511 | 9/1972 | Medipishi | 350/105 |
| 3,877,785 | 4/1975 | Schaefer | 350/106 |

FOREIGN PATENTS OR APPLICATIONS

| 804,929 | 12/1958 | United Kingdom | 350/104 |

Primary Examiner—Alfred E. Smith
Assistant Examiner—B. Wm. de los Reyes
Attorney, Agent, or Firm—Connolly and Hutz

[57] ABSTRACT

A reflective roadway marker includes an internally dished-out glass body having an integral optical system wherein the top wall of the internal cavity is inversely dome shaped to minimize the height of the marker while maximizing its thickness and yet accommodating its optical system.

20 Claims, 19 Drawing Figures

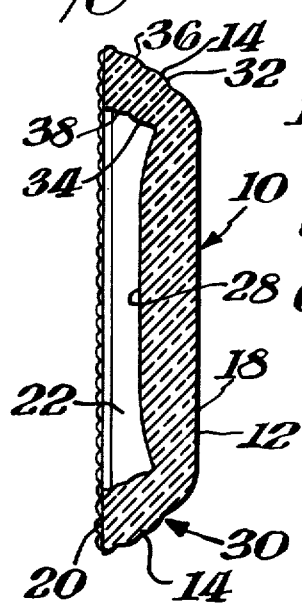
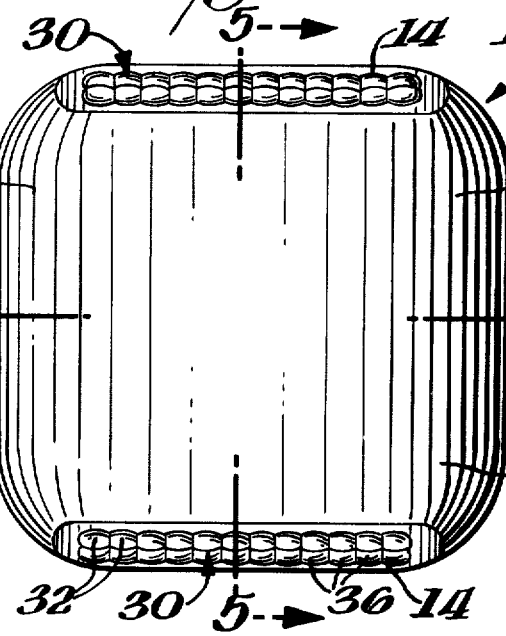
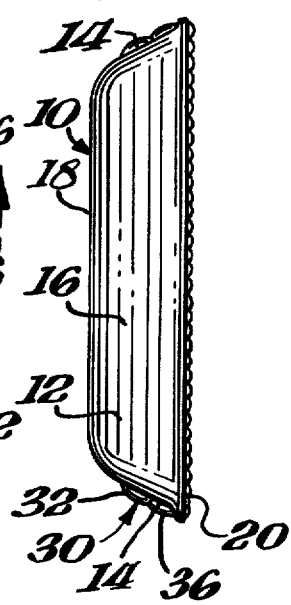
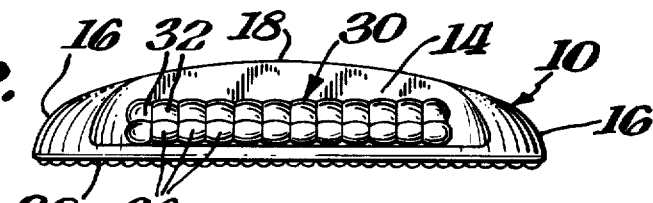
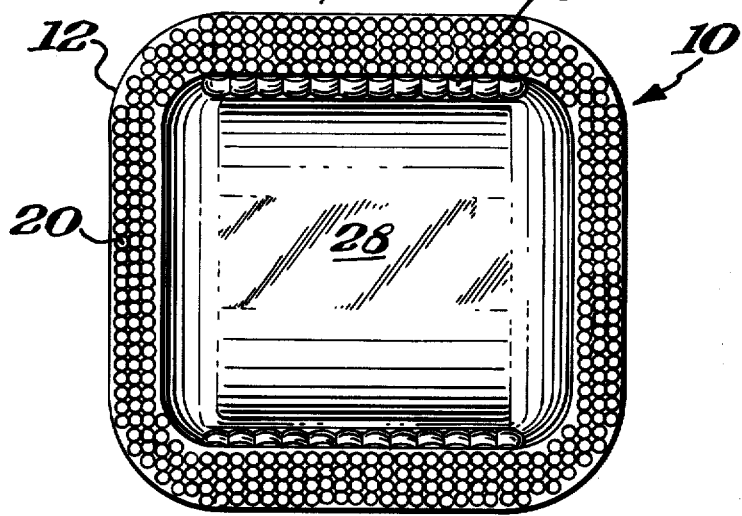
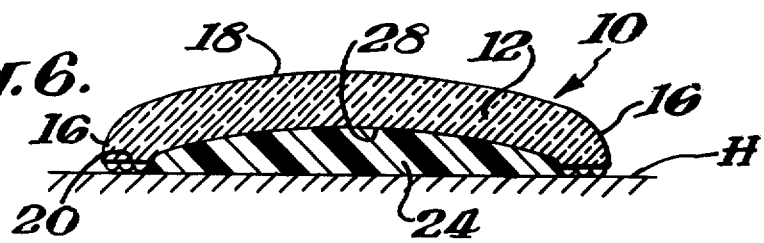

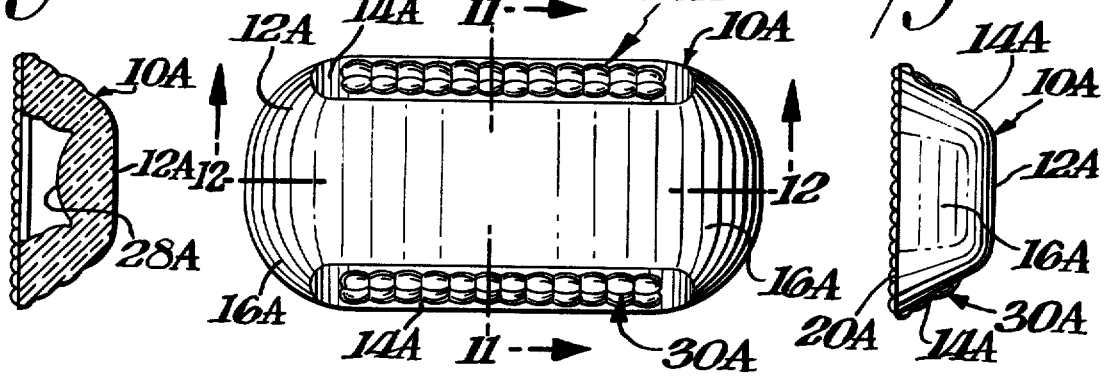
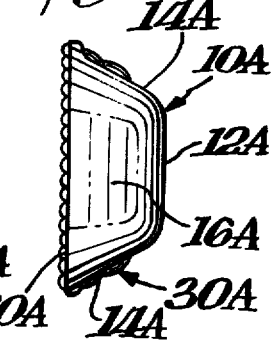
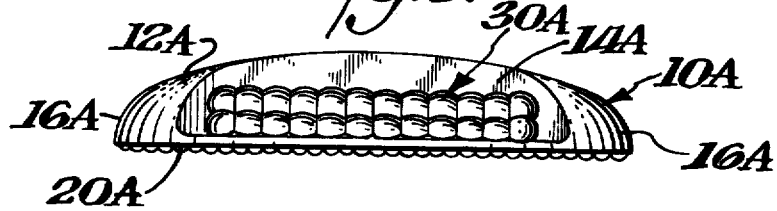
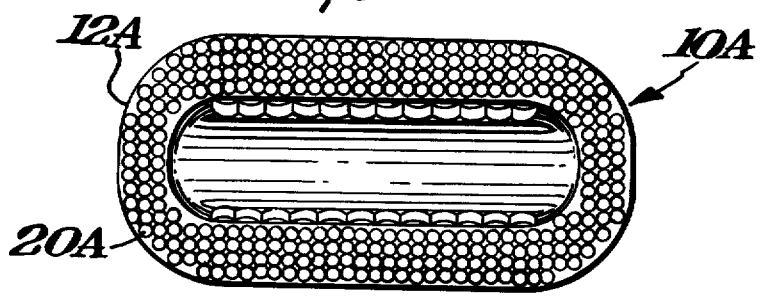
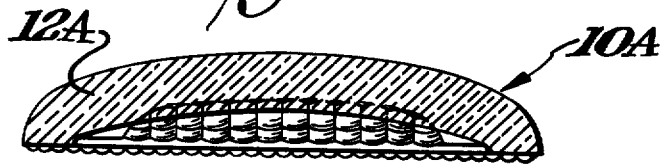

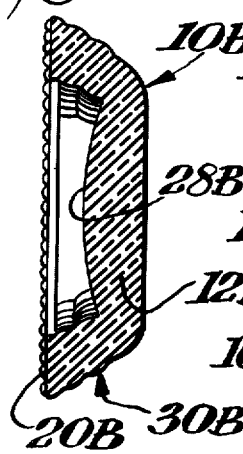
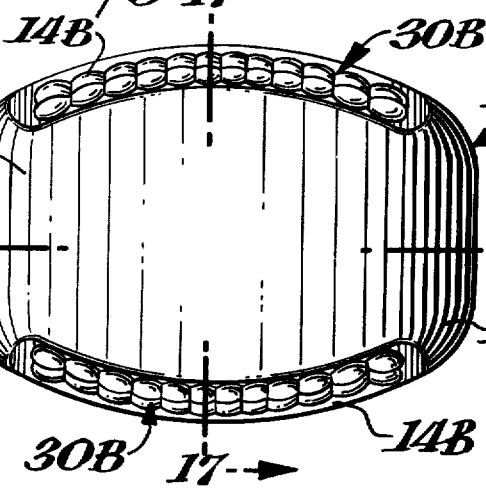
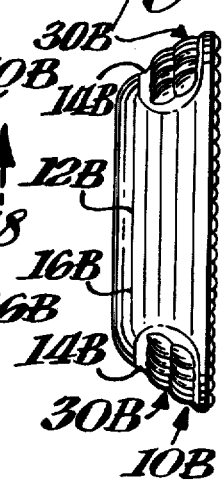
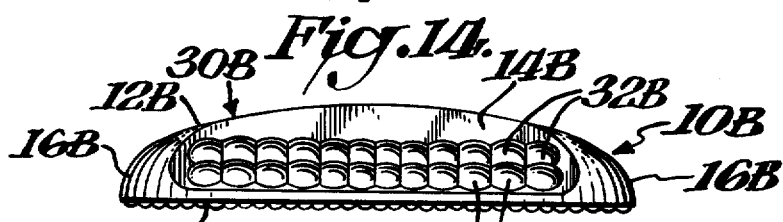
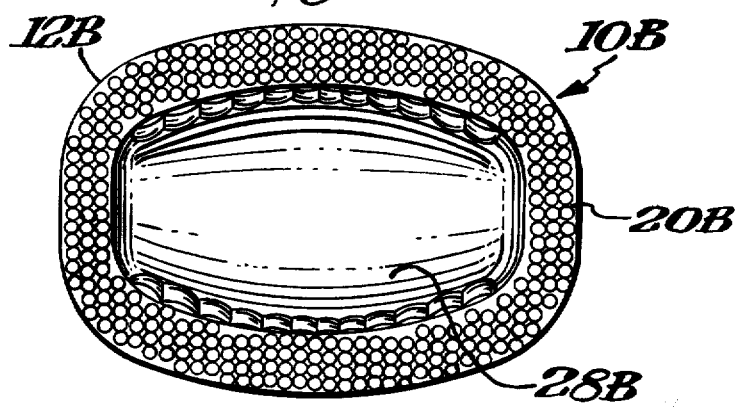
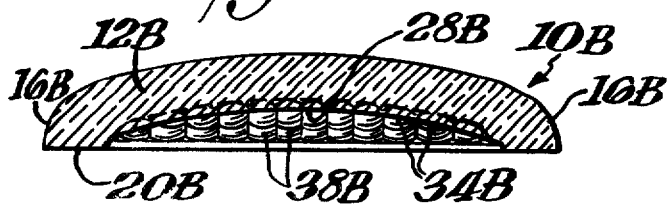
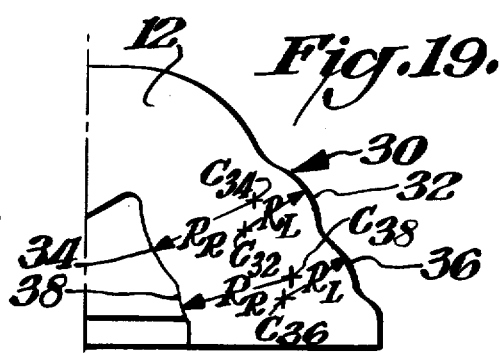

REFLECTIVE ROADWAY MARKER

CROSS-REFERENCE TO RELATED APPLICATIONS

This application is a continuation-in-part of copending application Ser. No. 296,947; filed Oct. 12, 1972 now U.S. Pat. No. 3,877,785. The parent application has as further continuations-in-part thereof application Ser. No. 305,167; filed Nov. 9,1972 now U.S. Pat. No. 3,867,102 and Ser. No. 404,864 now U.S. Pat. No. 3,901,583; filed Oct. 10, 1973, the details of these three prior applications are incorporated herein by reference thereto.

BACKGROUND OF THE INVENTION

As pointed out in the parent application, there is a need for an effective roadway marker which is capable of providing the desired optics while withstanding the heavy loads of vehicles. Parent application Ser. No. 296,947 provides a significant advancement in the art in the provision of a glass marker having an integral optical system wherein the glass is tempered so as not only to provide increased strength but also whereby, should failure occur, the glass particles disintegrate into harmless pieces having no or minimal sharp fracture edges. The internal cavity of the body member is filled with a potting compound and securing means are provided on the peripheral rim of the body member so that the marker itself may be conveniently secured to the existing roadway without the necessity for making any special provisions such as cavities in the roadway or the utilization of other securing means such as bolts as is frequently necessary with prior devices. Other improvements and ramifications are pointed out in the above noted continuation-in-parts of the above indicated application.

SUMMARY OF THE INVENTION

An object of this invention is to provide other useful manners of effectuating the broad concepts disclosed in the parent application and its continuations-in-part, by providing a durable tempered roadway marker.

A further object of this invention is to provide such a roadway marker which is so constructed as to lend itself to tempering techniques resulting in even greater strength whether the marker be reflective or even non-reflective.

A still further object of this invention is to provide such a marker wherein the glass optical system is so dimensioned as to provide a particularly effective retro-reflective system.

In accordance with this invention the marker is made from a glass body having a dished-out cavity which is ultimately filled with the potting material. The top wall of the inner cavity is inversely dome shaped thereby maximizing the thickness of the glass material which lends itself to tempering techniques so as to increase the strength of the body.

In accordance with another aspect of this invention the glass optical system includes a lens surface and a reflective surface associated therewith. The ratio of the radius of curvature of the reflective surface to the radius of curvature to the lens surface is substantially equal to the index of refraction of the glass. For example, with conventional soda:lime glass having an index of refraction of 1.5 the ratio of radii would likewise be 1.5.

Although in the preferred form of this invention the entire marker body is made of glass integral with its optical systems, the concepts of this invention may be effectuated by employing such glass optics in a marker made of material other than glass such as metal or plastic wherein the proper relationship of the lens and reflective surfaces are maintained with respect to the glass material of the optics.

In a preferred form of this invention the marker body has a low profile and in its plan view may be symmetrical of equal length sides or may be oblong shaped with for example the optics containing sides being twice as long as the intermediate sides. Still further the marker may be ovate shaped wherein the optics containing sides are longer than the intermediate sides but the optics containing sides are curved rather than straight to minimize traffic impact.

THE DRAWINGS

FIG. 1 is a top plan view of a roadway marker in accordance with one embodiment of this invention;

FIGS. 2, 3 and 4 are front, side and bottom views, respectively, of the marker shown in FIG. 1;

FIGS. 5 and 6 are cross-sectional views in elevation taken through FIG. 1 along the lines 5—5 and 6—6, respectively;

FIG. 7 is a top plan view of a further marker in accordance with this invention;

FIGS. 8, 9 and 10 are front, side and bottom views, respectively, of the marker shown in FIG. 7;

FIGS. 11 and 12 are cross-sectional views in elevation taken through FIG. 7 along the lines 11—11 and 12—12, respectively;

FIG. 13 is a top plan view of still yet another marker in accordance with this invention;

FIGS. 14, 15 and 16 are front, side and bottom views, respectively, of the marker shown in FIG. 13;

FIGS. 17 and 18 are cross-sectional views taken through FIG. 1 along the lines 17—17 and 18—18, respectively; and FIG. 19 is an enlarged elevation view of an optical system usable with any of the previously indicated markers.

It is noted that the drawings are to scale.

DETAILED DESCRIPTION

As previously indicated, this invention is based upon the improvements described in parent application Ser. No. 296,947; filed Oct. 12, 1972 and the later filed continuations-in-part thereof, the details of which are incorporated herein by reference thereto. Accordingly, the following description will be generally directed to features not described in the prior applications although some reiteration of features in those applications will, of course, be necessary.

At the onset it is noted that one of the problems faced by this invention is how to provide a durable, tempered roadway marker while balancing the many conflicting requirements. For example, if the marker is made of tempered glass its thickness should be maximized to maximize its strength; yet if the marker is too thick it will present a road hazard. Similarly, it is difficult to maximize the amount of glass material in the marker and still have a cavity which is necessary to provide the desired optics and to accommodate the potting material or sealing compound. The diverse requirements are satisfied with remarkably effective results as set forth in the following description of exemplary embodiments.

In accordance with one embodiment of this invention as illustrated in FIG. 1–6, roadway marker 10 includes a body member 12 having side walls 14, 14, 16, 16, top wall 18 and peripheral rim 20. Body member 12 has an internally dished-out construction thereby forming an internal cavity 22 exposed at its bottom wall. Rim 20 and the surfaces of cavity 22 may or may not stippled to enhance the securement of the marker to a roadway surface. As illustrated in FIG. 6 internal cavity 22 is filled with a potting material 24 which provides additional strength to the marker and cooperates in the securement thereof to highway H. Potting compound 24 may be of any suitable conventional materials and itself may have securing characteristics so as to directly secure the marker to the roadway and/or may have a separate adhesive applied to its exposed bottom surface which adhesive is likewise applied to the bottom of rim 20 for securement to the highway surface.

On opposite side walls of bottom member 12 retroreflective optics 30 are formed of a suitable glass composition. In a preferred form of this invention the body member itself is also of glass integral with the glass optics and is made in a manner set forth in the parent application wherein the glass is tempered to provide the necessary impact strength and whereby should failure occur the glass will break into harmless particles so as to minimize any road hazard being created.

A key feature of this invention which permits meeting the diverse requirements noted above is the contour of the top wall surface 28 defining the cavity 22, that is the lower surface 28 of the top wall 18 of the body member itself. In general to provide a roadway marker which includes an optical system efficiently functioning retroreflectively while minimizing any road obstruction the marker 10 is made of a low profile. By the arrangement best shown in FIG. 5, as well as in FIG. 3, the desired results are accomplished by forming top surface 28 as an inverted dome wherein the thickness of the top wall 18 increases from its juncture with the optics containing side walls 14, 14 to the center of the top wall. This improved contour enables tempering to a higher strain while permitting the low profile which lessens the impact of traffic on the marker. The inverted dome shaped top wall is particularly advantageous in that it permits a heavier thickness of glass which allows higher temperatures in the tempering furnace thus providing for a higher strain to be induced in the air quench process. By this arrangment the glass thickness in the center of the marker and just behind the optics is maximized.

In the embodiment illustrated in FIGS. 1–6, the optics containing walls 14 and the intermediate walls 16 which are free of optics are generally straight in plan view as illustrated for example in FIG. 1 and are of equal length, each side being for example 4 inches long but being joined by curved corners. The inner length of these walls which define the cavity 22 are, however, not of the same length in that for example the optics containing walls are 3.2 inches while the walls or sides being free of optics are only 3 inches long in the exemplary form wherein the peripheral rim and optics containing side walls are thereby thicker than the intermediate walls or sides. The inverted dome is formed by smoothly curving top surface 28 from its juncture with the optics containing wall 16 until a sufficient thickness has been reached whereupon the surface 28 is then flat in its general central area. The concepts of this invention may be practiced with other configurations such as by having a continuous smooth curve which reaches its maximum thickness at the precise center of the body instead of having a flat area in the center. Similarly, the smooth curve surface of top wall 28 may be an irregular curve whereby the maximum thickness is actually offset. The significant feature is that top wall 18 should increase from the juncture with the side walls generally toward the center of the top wall so as to achieve the previously noted advantages and it is to be understood that the term "inverted dome" is not intended to be limited to a continuous cruve nor to a curve having the precise maximum thickness at the center but rather is intended to mean a generally convex curvature which may include a flat central portion.

FIGS. 7–12 show a further embodiment of this invention which is generally similar to that shown in FIGS. 1–6 and accordingly like parts include like numbers with the suffix A being added to the embodiment of FIGS.. 7–12. A difference betwen the two embodiments is that the intermediate optics free walls 16A are only half the length of the optics carrying sides 14A thus resulting in an oblong marker. The oblong shape results in a smaller more compact span to support the impact. Although intermediate sides 16A include straight portions, they are generally curved. Further, as best illustrated in FIG. 11 top wall surface 28A is a continuous curved wall having a constant radius with its center along the central axis of body member 12A.

FIGS. 13–18 illustrate still yet another marker 10B in accordance with this invention. Marker 10B is generally similar to the previous embodiments and accordingly like reference numerals have been used for like parts with the suffix B. Marker 10B differs from the previous markers in the following respects. Intermediate optics free walls 16B are approximately ¾ the length of the optics carrying walls or sides. In this respect, for example, the length of the body as measured through the cross-section of line 17—17 of FIG. 13 would be, for example, three inches. Similarly, the length of the body along section line 18—18 would be 4 inches in the exemplary embodiment. As with marker 10A, top surface 28B is again a smooth curve of constant radius having its center along the central axis of the marker as illustrated in FIG. 17. A further distinction of marker 10B in contrast to markers 10 and 10A is that marker 10B is generally of ovate shape whereas marker 10 is generally square and marker 10A is generally oblong. In this respect the optics carrying sides 14B are curved rather than straight to give the ovate shape. The combination of the marker having intermediate walls which are shorter than the optics carrying walls and also having the leading face and optics walls being curved tends to lessen the impact of the tire. In this respect the ovate contour tends to make the tire glance off the side of the marker although, of course, a direct center impact will not be deflected. The semi-circular arrangement should also have greater mechanical strength than a square arrangement.

All three embodiments have in common the feature of larger radii in the area where the inner contour and the optics converge, i.e., at the corners of the sides. The illustrated embodiments include maximal optics centers per lineal inch which increases the retroreflectivity and also shallows up the intersection between the optics. The shallowing of intersections results in a mechanically strong structure.

The marker of this invention is particularly advantageous in that it provides the desired retroreflectivity while maximizing strength, minimizing impact and minimizing any road hazard. For example, the overall height of the marker is a maximum of three-fourth inches to minimize impact, whereas the inverted dome shape permits a top wall thickness of at least 0.45 inches in the center of the top wall to maximize strength. Further as later described, the optics include radii which are designed for maximum optical efficiency and for maximum strength without compromising the optics.

FIG. 19 illustrates the optical system 30 incorporated in the marker. This optical system is based upon the disclosure in parent application Ser. No. 296,947; filed Oct. 12, 1972. As indicated in that application, the optics are made of a glass such as soda:lime glass, this type of glass having an index of refraction of about 1.5. Optics 30 further includes a lens surface 32 and a reflective surface 34 associated therewith. In the multiple ball construction there is a further lens surface 36 and a further reflective surface 38 associated therewith. Each of these surfaces is formed from spherical segments and has a radius of curvature. As indicated in the parent application, the preferred ratio of the radius of curvature of the reflective surface with the corresponding lens surface is 1.5:1. That is to say the ratio of the radius of curvature of the reflective surface to the radius of curvature of the lens surface is substantially equal to the index of refraction of the glass material from which the optics are formed. For example, in the embodiment illustrated in FIG. 19, the radius of curvature $R_R$ of reflective surfaces 34, 38 is 0.3 inches whereas the radius of curvature $R_L$ of each lens surface 32, 36 is 0.2 inches and the ratio of radii is 0.3:0.2 or 1.5:1.

By maintaining the proper relationship of these radii of curvature with respect to the refractive index of the glass the concentrated retroreflection which is a characteristic of this invention is obtained. Although others have used spherical front face lens, the combination of the spherical front face lens and the spherical reflector as set forth herein, results in an optical system which functions efficiently whether incident light is on axis or off-axis. For example, as noted in the parent application, the optics of this invention function with off-axis light at least 20° right or left. With this arrangement there is a close packing of the optic centers to create maximum optic centers possible for square inch of optics exposed. This concentration of optics centers maximizes the efficiency in retroreflecting the greatest quantity of light per square inch of optics exposed while still obtaining angular retroreflective action.

As indicated in FIG. 19, the center of curvature $C_{34}$ of the lens surface 34 is offset with respect to the center of curvature $C_{32}$ of the lens surface 32. Similarly, the center of curvature $C_{38}$ is offset with respect to the center of curvature $C_{36}$. These offset centers of curvatures guarantee that all incident light from an approaching vehicle is retroreflected back to the desired point in space, i.e., the driver's line of vision, so that light from a headlight will pass through the lens surface and be reflected by the reflective surface up into the driver's eyes rather than, for example, back toward the headlight. Although other optical designs may reflect some scattered light back in the correct general direction, a passive light source such as a roadway marker should ideally have optics of the most efficient design possible to be able to function properly on the roadway. The arrangement of the spherical lens with its special off-axis placement of the spherical reflector and relating the radii ratio to the index of refraction allows the optics to function whether the marker is directly in front of a vehicle or for example a 1,000 feet down the road. By shifting the off-axis position of the center of curvature of the reflector, it is possible to optimize the performance of the axis at selected distances down the road.

The concepts of this invention with respect to the particular optical system described may be utilized in other types of markers for example where the body member itself is of a material other than glass. Thus it is possible to practice this invention where the optics are not integrally formed with the marker body member but where the proper relationships are maintained between the radius of curvature of the reflector surface and that of the lens surface with respect to the glass used in the optics per se.

Obviously, other changes are possible to carry out the teachings of this invention including the use of other dimensions and other materials including any suitable glass composition. The specifically described forms are merely intended to exemplify how the best mode of this invention may be practiced.

It is to be further understood that although the invention has been specifically described with respect to reflective roadway markers, the concepts herein particularly regarding the use of an inverted dome to provide an improved glass marker may be applied to non-reflective markers used for example to delineate walkways as described in application Ser. No. 296,947; filed Oct. 12, 1972.

What is claimed is:

1. A retroreflective roadway marker comprising a body member, said body member having a peripheral rim and having top and side walls, said body member being of internally dished-out construction thereby forming an internal cavity exposed at its bottom wall, a retroreflective optical system in at least one side wall of said body member, the optics containing side wall being inclined upwardly and inwardly, said body member, and its optical system being integral and made of tempered glass to provide improved impact strength and to disintegrate into harmless particles upon failure, said optical system including an externally disposed lens surface and an internally disposed reflective surface associated therewith, each of said lens surface and said reflective surface having a radius of curvature, and the ratio of the radius of curvature of said reflective surface to the radius of curvature of said lens surface being substantially equal to the index of refraction of the glass used for the material of said optical system.

2. The marker of claim 1 wherein said ratio is about 1.5:1, and said glass being a soda:lime glass.

3. A retroreflective roadway marker comprising a body member, said body having a peripheral rim and having top and side walls, said body being of internally dished-out construction thereby forming an internal cavity exposed at its bottom wall, a retroreflective optical system in at least one side wall of said body, the optics containing side wall being inclined upwardly and inwardly, said body and its optical system being integral and made of tempered glass to provide improved impact strength and to disintegrate into harmless particles upon failure, the inner top wall of said cavity being inversely dome shaped with respect to a section taken through said optical system to maximize the thickness of said top wall of said body and provide for heavier glass whereby the strength of said body is enhanced, said cavity thereby having a greater heighth at its location adjacent said optical system than in the central area of said cavity, and said top wall increasing in thickness from adjacent said optical system to the center of said top wall.

4. The marker of claim 3 wherein said inversed dome shape is a smooth curve of constant radius.

5. The marker of claim 3 wherein an optical system is provided in opposite walls of said body whereby said body includes a pair of optics containing sides and a pair of interposed sides free of optics.

6. The marker of claim 5 wherein each of said optics containing sides is about the same length as each side free of optics, and all said sides being generally straight in plan view and joined together by curved corners.

7. The marker of claim 5 wherein each of said optics containing sides is about twice as long as each of said sides free of optics, each of said optics containing sides in plan view being generally straight, each of said sides free of optics in plan view being generally curved, and all of said sides being joined together by curved corners.

8. The marker of claim 5 wherein each of said sides free of optics is about three-fourths the length of each of said optics containing sides, each of said optics containing sides in plan view being curved, and said body in plan view being of generally ovate shape.

9. The marker of claim 5 wherein said optics containing sides and its portions of said peripheral rim are thicker than said sides free of optics and its portions of said peripheral rim.

10. The marker of claim 5 wherein each of said optics containing sides in plan view is smoothly curved, and said body in plan view being of generally ovate shape.

11. The marker of claim 5 wherein the overall height of said body is no greater than about three-fourths inches, each of said optics containing sides having a length of no greater than about 4 inches and being at least as long as each of said sides free of optics, and said top wall having a thickness at its center of at least about 0.45 inches.

12. The marker of claim 3 wherein the center of said dome shape is flat.

13. A reflective roadway marker comprising a body member, said body member having a peripheral rim and having top and side walls said body member being of internally dished-out construction thereby forming an internal cavity exposed at its bottom wall, a retroreflective optical system in at least one side wall of said body member, said optical system being made of a glass material, the optics containing side wall being inclined upwardly and inwardly for being disposed toward the headlight of an oncoming vehicle, said optical system including an externally disposed lens surface and an internally disposed reflective surface associated therewith, each of said lens surface and said reflective surface having a radius of curvature, and the ratio of the radius of curvature of said reflective surface to the radius of curvature of said lens surface being substantially equal to the index of refraction of the glass used for the material of said optical system.

14. The marker of claim 13 wherein said body member is made of glass integral with said optical system.

15. The marker of claim 13 wherein one of said optical systems is formed in opposite side walls of said body member.

16. A retroreflective roadway marker comprising a body member, said body member having a peripheral rim and having top and side walls, said body member being of internally dished-out construction thereby forming an internal cavity exposed at its bottom wall, a retroreflective optical system in at least one side wall of said body member, the optics containing side wall being inclined upwardly and inwardly for being disposed twoard the headlight of an oncoming vehicle, said optical system being made of a soda lime glass material, said optical system including an externally disposed lens surface and an internally disposed reflective surface associated therewith, each of said lens surface and said reflective surface having a radius of curvature, and the ratio of the radius of curvature of said reflective surface to the radius of curvature of said lens surface being about 1.5:1.

17. The marker of claim 16 wherein said body member is made of glass integral with said optical system.

18. The marker of claim 16 wherein said reflective and said lens surfaces are formed by spherical segments having offset centers of curvature.

19. A roadway marker comprising a body member, said body member having a peripheral rim and having top and side walls, said body member being of internally dished-out construction thereby forming an internal cavity exposed at its bottom wall, said body member being made of tempered glass to provide improved impact strength and to disintegrate into harmless particles upon failure, said top wall having an inner surface at the top of said cavity, said inner top surface being inversely dome shaped with respect to a cross-sectional elevation view taken through opposite side walls of said body member, and said top wall increasing in thickness from its juncture with said side walls to the center of said top wall.

20. The marker of claim 19 wherein said marker is non-reflective.

* * * * *

UNITED STATES PATENT AND TRADEMARK OFFICE
CERTIFICATE OF CORRECTION

PATENT NO. : 3,922,066
DATED : November 25, 1975
INVENTOR(S) : HOWARD A. SCHAEFER It is certified that error appears in the above-identified patent and that said Letters Patent are hereby corrected as shown below:

Column 3, line 2, "Fig." should be --- Figs. ---

Column 4, line 19, "Figs.." should be --- Figs. ---

Column 4, line 19, "between" is misspelled

Column 6, line 55, delete "member"

Column 8, line 22, "toward" is misspelled

Signed and Sealed this ninth Day of March 1976

[SEAL]

Attest:

RUTH C. MASON
*Attesting Officer*

C. MARSHALL DANN
*Commissioner of Patents and Trademarks*